US012275240B2

(12) United States Patent
Oguchi

(10) Patent No.: US 12,275,240 B2
(45) Date of Patent: Apr. 15, 2025

(54) CUTTER UNIT AND PRINTER WITH CUTTER UNIT

(71) Applicant: FUJITSU COMPONENT LIMITED, Tokyo (JP)

(72) Inventor: Tatsuya Oguchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 18/411,605

(22) Filed: Jan. 12, 2024

(65) Prior Publication Data

US 2024/0326478 A1 Oct. 3, 2024

(30) Foreign Application Priority Data

Mar. 28, 2023 (JP) ................................ 2023-050862

(51) Int. Cl.

*B41J 11/70* (2006.01)
*B65H 35/06* (2006.01)
*B65H 41/00* (2006.01)

(52) U.S. Cl.

CPC .............. *B41J 11/70* (2013.01); *B65H 35/06* (2013.01); *B65H 41/00* (2013.01); *B65H 2301/51532* (2013.01); *B65H 2701/192* (2013.01)

(58) Field of Classification Search

CPC .......... B41J 11/70; B65H 35/06; B65H 41/00; B65H 2301/51532; B65H 2701/192
See application file for complete search history.

(56) References Cited

U.S. PATENT DOCUMENTS

| | | | | |
|---|---|---|---|---|
| 6,368,045 | B1 * | 4/2002 | Ashman | B65H 37/002 414/416.05 |
| 6,786,266 | B2 * | 9/2004 | Fukada | B65H 41/00 156/716 |
| 2002/0108709 | A1 * | 8/2002 | Fukada | B65H 41/00 156/719 |
| 2010/0089535 | A1 * | 4/2010 | Hosono | B65C 9/0006 156/719 |
| 2012/0249713 | A1 * | 10/2012 | Sato | B65H 35/06 347/171 |
| 2013/0292061 | A1 * | 11/2013 | Tanaka | B41J 15/044 156/538 |
| 2016/0207732 | A1 * | 7/2016 | Park | B32B 43/006 |

FOREIGN PATENT DOCUMENTS

| | | |
|---|---|---|
| EP | 2631045 | 8/2013 |
| EP | 4112318 | 1/2023 |
| JP | 2003-089247 | 3/2003 |

* cited by examiner

*Primary Examiner* — David H Banh
(74) *Attorney, Agent, or Firm* — IPUSA, PLLC

(57) ABSTRACT

A cutter unit according to an embodiment of the present disclosure is configured to cut recording paper that is conveyed. The cutter unit includes a movable blade that can advance toward or retract from the recording paper and is configured to cut the recording paper when the movable blade advances. The cutter unit also includes a peeling mechanism including a contacting portion configured to move in a direction opposite to a direction of advancement or retraction of the movable blade and contact the recording paper.

10 Claims, 14 Drawing Sheets

CUTTER UNIT AND PRINTER WITH CUTTER UNIT

CROSS-REFERENCE TO RELATED APPLICATION

This application is based upon and claims the benefit of priority of the prior Japanese Patent Applications No. 2023-050862 filed on Mar. 28, 2023, the entire contents of which are incorporated herein by reference.

BACKGROUND

A certain aspect of the embodiments is related to a cutter unit and a printer with a cutter unit.

Examples of recording paper include plain paper including no adhesive layer, and labels including a viscous layer. Examples of labels include those including a mat board and those including no mat board. When feeding a linerless label including no mat board and applying prints on the linerless label, there may be a case where the linerless label fails to peel from a cutter blade of a cutter unit upon being cut by the cutter unit, and causes a jam (paper jam).

Hence, the printer disclosed in Patent Document 1 is configured to cut a linerless label by rotating a rotary blade relative to a fixed blade, and softly paste the cut linerless label on a paper ejection section on which the rotary blade is fixed.

RELATED ART

Patent Document 1

Japanese Patent Application Laid-Open Publication No. 2003-89247

However, the printer disclosed in Patent Document 1 in which the rotary blade and the ejection section are integrated may encounter a case where a linerless label adheres to both of the rotary blade and the ejection section. If the linerless label adheres to the rotary blade, a jam may occur likewise.

SUMMARY

The present disclosure provides a cutter unit that can inhibit adhesion of recording paper to a movable blade, and a printer with a cutter unit.

A cutter unit according to an embodiment of the present disclosure includes: a movable blade that can advance toward or retract from the recording paper and is configured to cut the recording paper when the movable blade advances; and a peeling mechanism including a contacting portion configured to move in a direction opposite to a direction of advancement or retraction of the movable blade and contact the recording paper.

According to an embodiment, it is possible to inhibit adhesion of recording paper to a movable blade.

DESCRIPTION OF EMBODIMENTS

Figure 1:
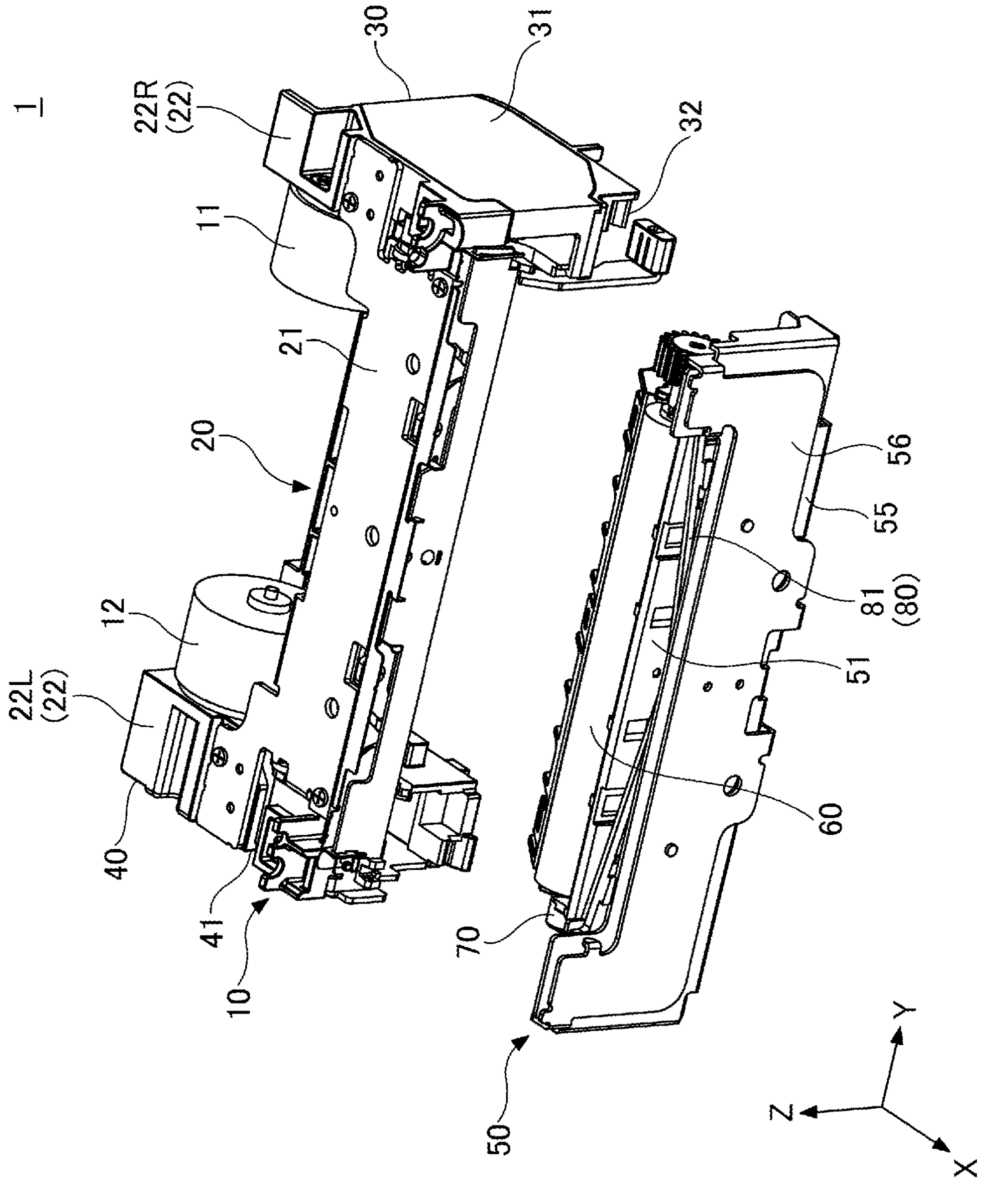
FIG. 1 is an exploded oblique perspective view illustrating a printer unit and a cutter unit of a printer according to an embodiment.

Embodiments for carrying out the present disclosure will be described below with reference to the drawings. The same components will be denoted by the same reference numerals in the drawings, and overlapping descriptions about them may be omitted.

FIG. 1 is an exploded oblique perspective view illustrating a printer unit 10 and a cutter unit 50 of a printer 1 according to an embodiment. An X-axis direction, a Y-axis direction, and a Z-axis direction indicated in FIG. 1 and succeeding drawings are directions perpendicular to one another. The X-axis direction is a direction in which the printer unit 10 and the cutter unit 50 connect to each other. Depending on the case, a surface on the X-axis positive direction side may be described as a front surface, and a surface on the X-axis negative direction side may be described as a rear surface. The Y-axis direction is the direction of the axis of a platen 60, and may be described as a width direction of each unit. The Z-axis direction is a direction in which a movable blade 81 described below moves, and may be described as an upper-lower direction, a height direction, or a vertical direction of each unit.

The printer 1 illustrated in FIG. 1 is an apparatus configured to convey recording paper L (see FIG. 2) in the X-axis positive direction over a Z-axis negative direction surface (lower surface) side, and apply prints on a Z-axis positive direction surface (upper surface) side of the recording paper L. The recording paper L is not particularly limited, and examples of the recording paper L include seal-type labels to be pasted on articles, and tickets.

The printer 1 includes a printer unit 10 and a cutter unit 50. Both of the units constitute a unit assembly in which they are assembled and integrated with each other in the X-axis direction. The recording paper L is conveyed in the X-axis positive direction along the upper surface of the unit assembly (also see FIG. 2).

The printer 1 also includes a non-illustrated thermal head unit above a portion at which the printer unit 10 and the cutter unit 50 are connected. For example, while the thermal head unit contacts the upper surface of the recording paper L that is conveyed, a heating element in the head generates heat in accordance with the print content. By the recording paper L being heated based on the heat generation of the thermal head unit, the coating on the portion develops a color as a print.

The printer unit 10 includes various structural parts that are configured to hold the recording paper L wound in a roll shape, and to convey the recording paper L. Specifically, the printer unit 10 includes a platen motor 11, a cutter motor 12, a frame 20, a platen gear mechanism 30, and a cutter gear mechanism 40.

The frame 20 is formed in an approximately square U shape in a top view perspective in which it is seen from the Z-axis positive direction side, and includes a width direction frame 21 extending in the Y-axis direction, and a pair of gear boxes 22 projecting in the X-axis negative direction from both ends of the width direction frame 21. The pair of gear boxes 22 projects by a short distance in the Z-axis negative direction from the width direction frame 21. The platen 60 of the cutter unit 50 described below is partly positioned in the space sandwiched between the pair of gear boxes 22 below the width direction frame 21.

The platen motor 11 and the platen gear mechanism 30 are situated on the gear box 22R, of the pair of gear boxes 22, that is on the platen gear side on the Y-axis positive direction side in FIG. 1. The main body of the platen motor 11 is fixed on a surface of the gear box 22R on the Y-axis negative direction side. The rotation shaft of the platen motor 11 projects from the main body to the Y-axis positive direction side, and penetrates a surface of the gear box 22R on the Y-axis negative direction side. The platen gear mechanism 30 is situated on the Y-axis positive direction side of the gear box 22R. As the platen motor 11, one having a rotation shaft that can rotate normally and reversely may be used.

The platen gear mechanism 30 is contained in the gear box 22R and covered by a gear cover 31, and is configured to transmit a rotational driving force of the rotation shaft of the platen motor 11 via a plurality of gears 32. Each gear 32 of the platen gear mechanism 30 may have a speed decreasing function for decreasing the rotation speed of the platen motor 11.

On the other hand, the cutter motor 12 and the cutter gear mechanism 40 are situated on the gear box 22L, of the pair of gear boxes 22, that is on the cutter gear side on the Y-axis negative direction side in FIG. 1. The main body of the cutter motor 12 is fixed on a surface of the gear box 22L on the Y-axis positive direction side. The rotation shaft of the cutter motor 12 projects from the main body to the Y-axis negative direction side, and penetrates a surface of the gear box 22L on the Y-axis positive direction side. The cutter gear mechanism 40 is situated on the Y-axis negative direction side of the gear box 22L. The cutter motor 12 according to the present embodiment is one having a rotation shaft that can rotate normally and reversely.

Figure 4:
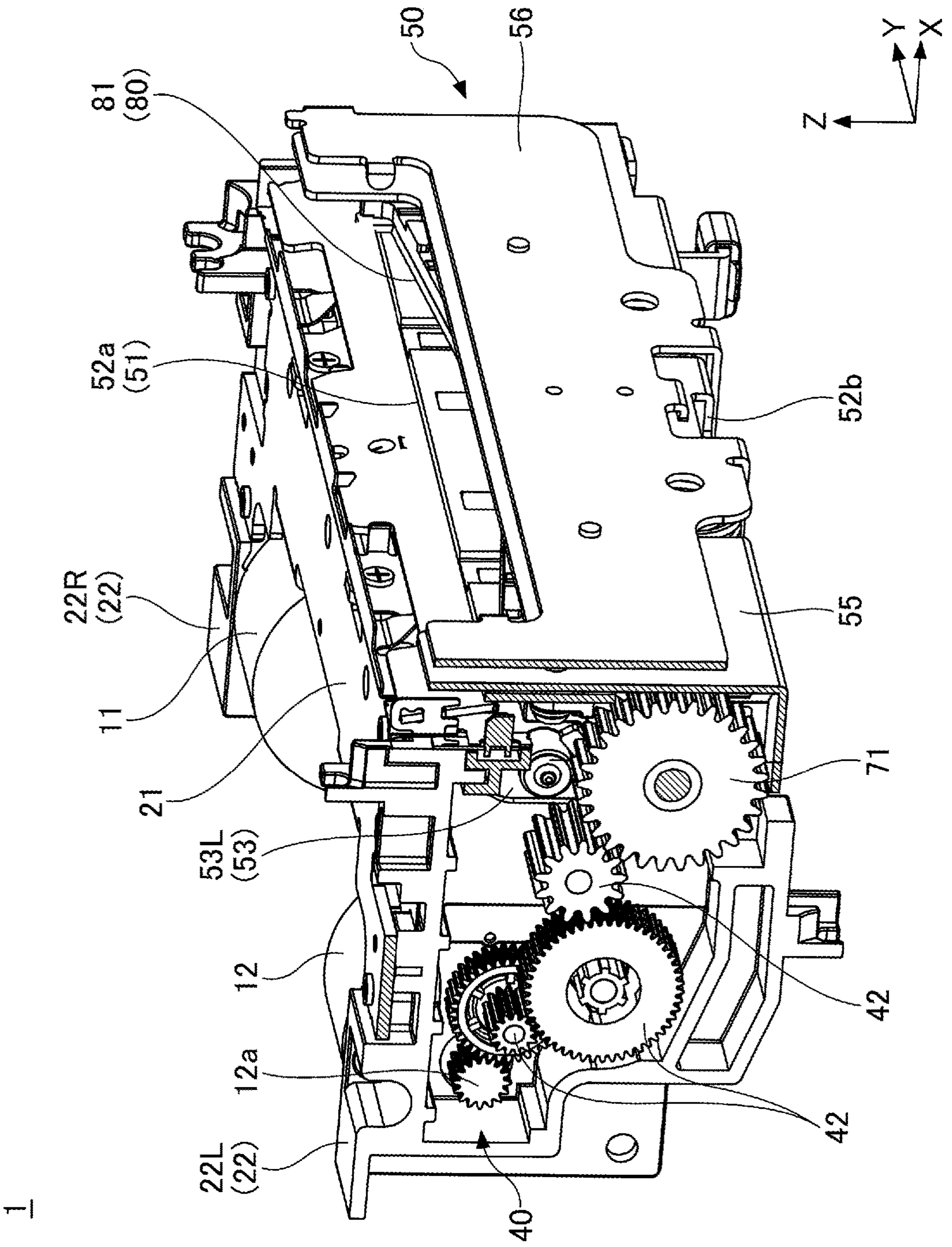
FIG. 4 is an oblique-perspective cross-sectional partial view illustrating a cutter gear mechanism configured for a unit assembly.

The cutter gear mechanism 40 is contained in the gear box 22L and covered by a gear cover 41, and is configured to transmit a rotational driving force of the rotation shaft of the cutter motor 12 via a plurality of gears 42 (see FIG. 4). Each gear 42 of the cutter gear mechanism 40 may have a speed decreasing function for decreasing the rotation speed of the cutter motor 12.

The cutter unit 50 is assembled with the printer unit 10 described above. The cutter unit 50 is configured to receive a rotational driving force that is transmitted from the cutter motor 12 and the cutter gear mechanism 40, and to cut the recording paper L using the rotational driving force. That is, the cutter motor 12 and the cutter gear mechanism 40 constitute an actuating unit configured to actuate the cutter unit 50. The cutter unit 50 is configured to receive a rotational driving force that is transmitted from the platen motor 11 and the platen gear mechanism 30, and to rotate the platen 60 using the rotational driving force. The printer 1 does not need to include the platen 60 in the cutter unit 50, but may include the platen 60 in the printer unit 10.

Figure 2:
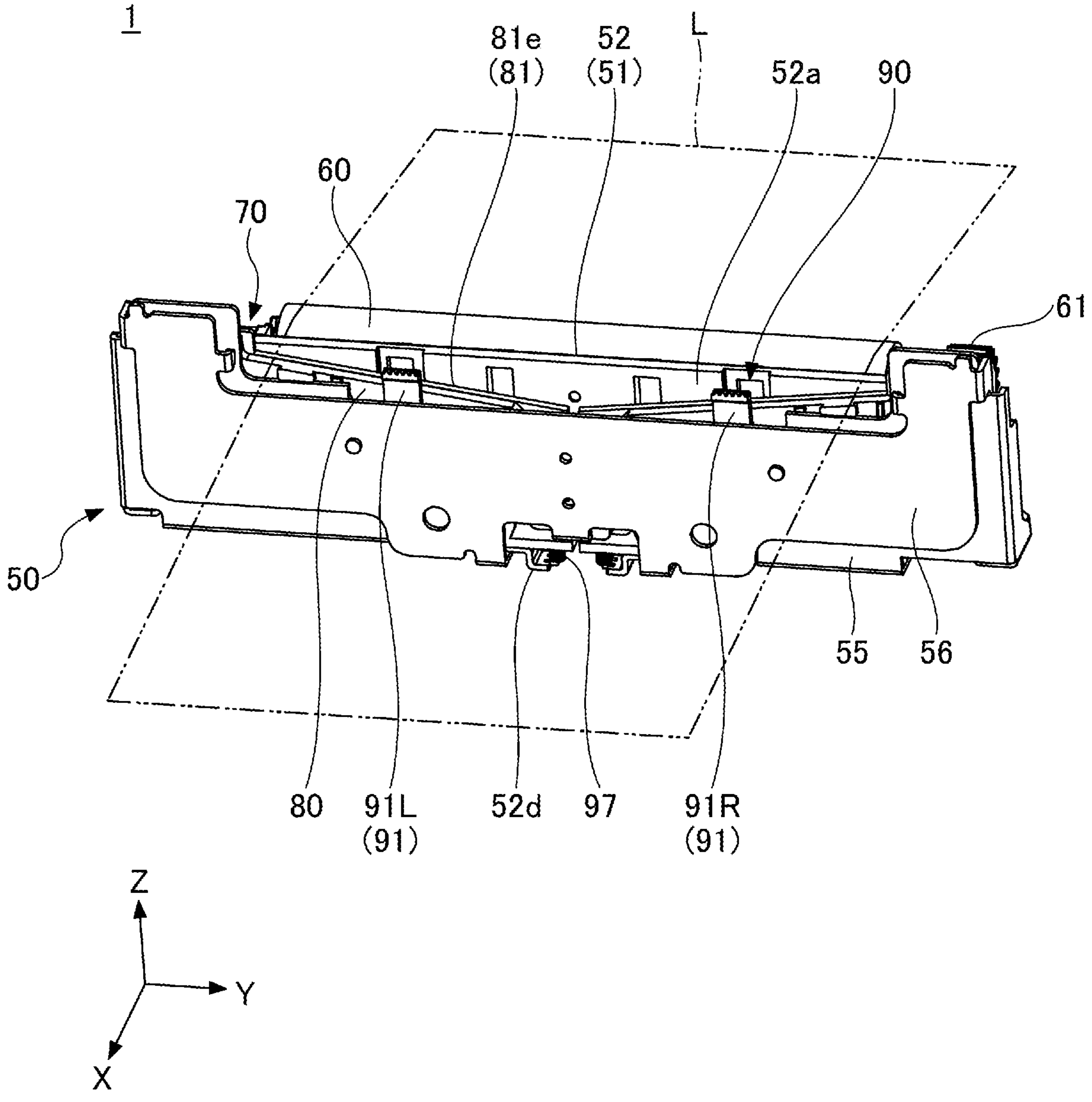
FIG. 2 is an oblique perspective view of a cutter unit and recording paper seen from an X-axis positive direction side.

FIG. 2 is an oblique perspective view of the cutter unit 50 and the recording paper L seen from the X-axis positive direction side. As illustrated in FIG. 2, the recording paper L passes above the cutter unit 50. In order to cut the recording paper L, the cutter unit 50 moves a movable blade 81 upward or downward in the upper-lower direction. Specifically, the cutter unit 50 includes a main frame 51, the platen 60, a cutter drive transmission mechanism 70, a cutter structure 80 including the movable blade 81 described above, and a peeling mechanism 90.

Figure 3:
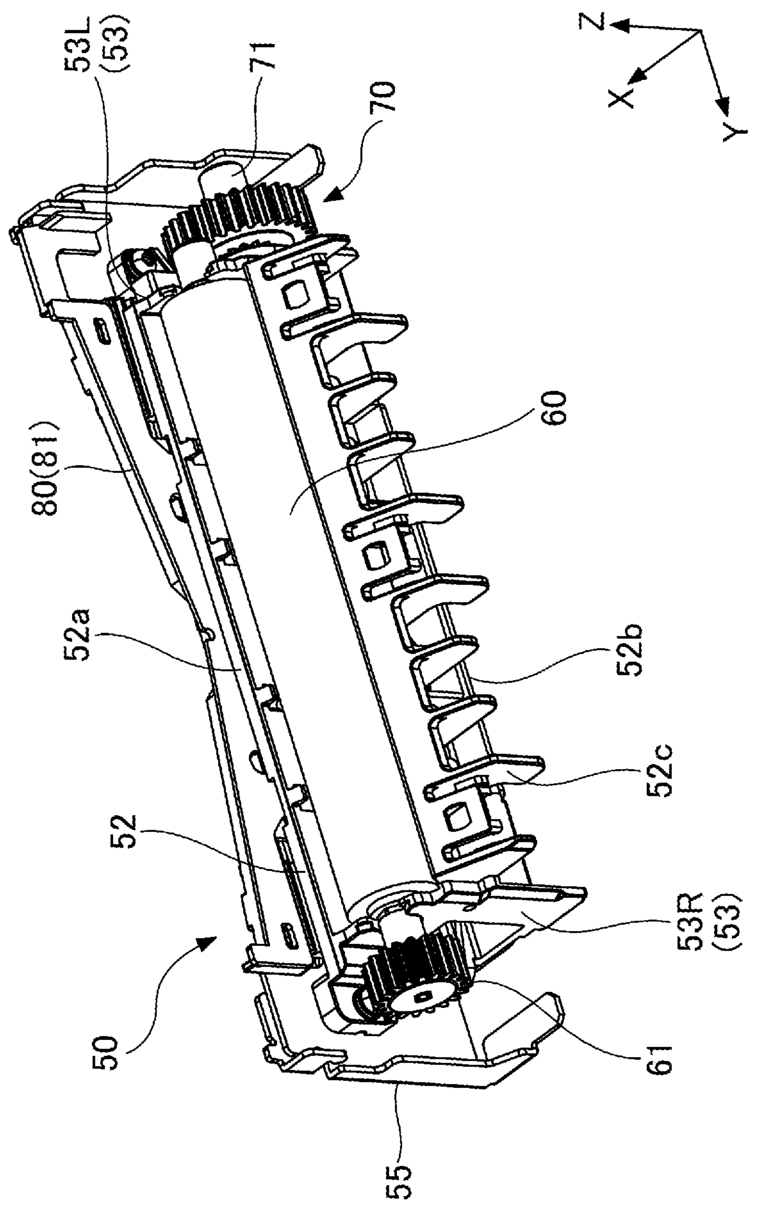
FIG. 3 is an oblique perspective view of a cutter unit seen from an X-axis negative direction side.

FIG. 3 is an oblique perspective view of the cutter unit 50 seen from the X-axis negative direction side. As illustrated in FIG. 2 and FIG. 3, the main frame 51 is a supporting element supporting the platen 60, the cutter drive transmission mechanism 70, the cutter structure 80, and the peeling mechanism 90. The main frame 51 is formed in an approximately square U shape opened at the top in a cross-sectional view along the X-axis direction, and partly covers the front surface side, the rear surface side, the lower side of the platen 60. The main frame 51 includes a base 52 having this approximately square U shape and extending in the Y-axis direction, and a pair of side panels 53 supporting the platen 60 rotatably.

More specifically, the base 52 includes a cutter guide wall 52*a* situated on the X-axis positive direction side, a bottom portion 52*b* situated on the Z-axis negative direction side, and a rear structure 52*c* situated on the X-axis negative direction side. The cutter guide wall 52*a* is formed in a plate shape extending in the Y-axis direction and the Z-axis direction and having a thickness in the X-axis direction. The cutter guide wall 52*a* has a function for guiding sliding of the cutter structure 80 in the upper-lower direction.

The main frame 51 also includes internal reinforcement sheet metals 55 and an external reinforcement sheet metal 56 (also see FIG. 1) on a surface of the cutter guide wall 52*a* opposite to the platen 60 side. The internal reinforcement sheet metals 55 project from the cutter guide wall 52*a* outward in the Y-axis direction and the Z-axis direction, and cover the cutter guide wall 52*a*, a platen gear 61, the cutter drive transmission mechanism 70, and the cutter structure 80 from the X-axis positive direction side. The external reinforcement sheet metal 56 is situated on the external side (X-axis positive direction side) of the internal reinforcement sheet metals 55, and covers a major part of the internal reinforcement sheet metals 55.

The bottom portion 52*b* of the base 52 is continuous with the lower portion of the cutter guide wall 52*a* and the lower portions of the pair of side panels 53, and extends in the X-axis direction by a dimension greater than the diameter of the platen 60. The rear structure 52*c* has a fin structure that is continuous with the rear side of the bottom portion 52*b*. The rear structure 52*c* is formed in, for example, a triangular shape in a side view perspective in which it is seen from the Y-axis direction sides, and projects by a short distance in the Z-axis positive direction. In a state in which the printer unit 10 and the cutter unit 50 are assembled with each other, the rear structure 52*c* is positioned in a space enclosed by the width direction frame 21 and the pair of gear boxes 22.

A shaft of the platen 60 on one end side is supported rotatably or pivotally on a side panel 53R, of the pair of side panels 53, that is on the Y-axis positive direction side. The shaft of the platen 60 on the other end side is supported rotatably or pivotally on a side panel 53L, of the pair of side panels 53, that is on the Y-axis negative direction side.

The platen gear 61 fixed on the shaft of the platen 60 is situated on the side panel 53R. In a state in which the printer unit 10 and the cutter unit 50 are attached on each other, the platen gear 61 meshes with a predetermined gear 32 of the platen gear mechanism 30 described above. The platen 60 rotates in the main frame 51 by receiving a rotational driving force of the platen motor 11 transmitted via each gear 32 and the platen gear 61.

The platen 60 is formed in a cylindrical shape extending along the Y-axis direction. The platen 60 supports the lower surface of the recording paper L during printing by the thermal head unit. Appropriate coating may be applied on the surface of the platen 60 to weaken or disable adhesion of the platen 60 to an adhesive layer provided on the lower surface of the recording paper L when the recording paper L is a linerless label. The platen 60 conveys the recording paper L in the X-axis direction by being rotated by the rotational driving force of the platen gear mechanism 30.

The cutter drive transmission mechanism 70 is situated on the external side (Y-axis negative direction side) of the side panel 53L. The cutter drive transmission mechanism 70 includes a first gear 71. In a state in which the printer unit 10 and the cutter unit 50 are attached on each other, the first gear 71 meshes with a distal gear 42 of the cutter gear mechanism 40 described above, the distal gear 42 being distanced from a motor gear 12*a*.

FIG. 4 is an oblique-perspective cross-sectional partial view illustrating the cutter gear mechanism 40 configured for the unit assembly. As illustrated in FIG. 4, the cutter gear mechanism 40 includes the plurality of gears 42 between the motor gear 12*a* joined to the rotation shaft of the cutter motor 12 and the first gear 71 of the cutter unit 50.

The first gear 71 is axially supported on the side panel 53L of the main frame 51 and a side portion (non-illustrated) of the internal reinforcement sheet metal 55 of the main frame 51 (also see FIG. 3). By meshing with the distal gear 42, the first gear 71 receives the rotational driving force transmitted from the cutter motor 12 and rotates. As the cutter motor 12 can rotate normally and reversely, the first gear 71 can also rotate normally and reversely.

Figure 5A:
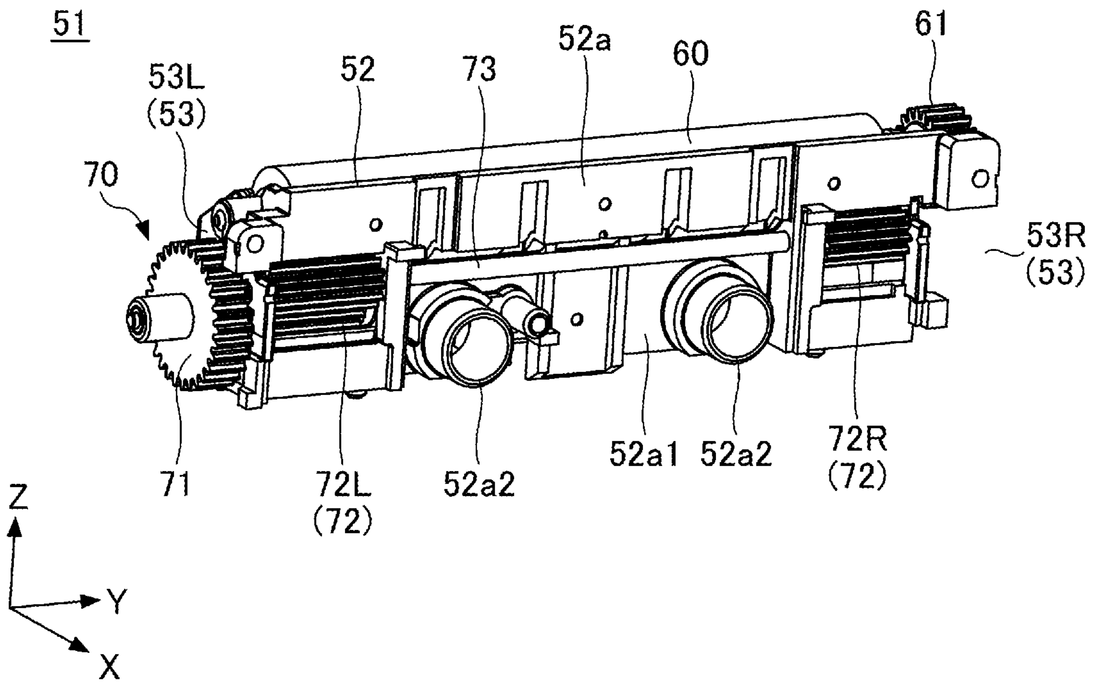
FIG. 5A is an oblique perspective view illustrating a main frame.
Figure 5B:
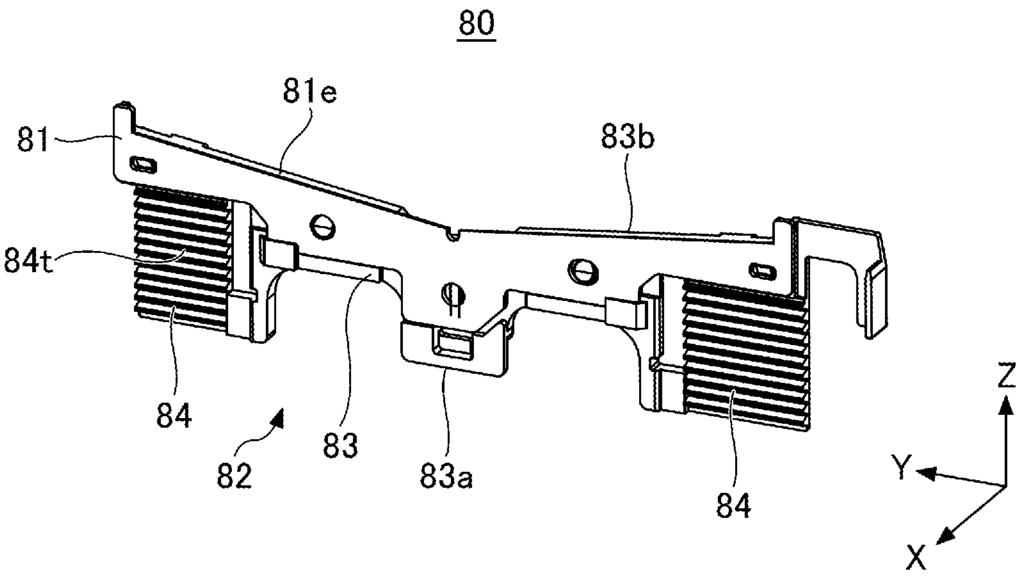
FIG. 5B is an oblique perspective view illustrating a cutter structure.

FIG. 5A and FIG. 5B are oblique perspective views illustrating the main frame 51 and the cutter structure 80. FIG. 5A is a view of the main frame 51 seen from the X-axis positive direction side. FIG. 5B is a view of the cutter structure 80 seen from a side facing the cutter guide wall 52*a* (X-axis negative direction side). As illustrated in FIG. 5A, the cutter drive transmission mechanism 70 includes second gears 72 on the cutter guide wall 52*a* in addition to the first gear 71, a second gear 72 being able to mesh with the first gear 71. The cutter guide wall 52*a* has a step 52*al* at a position that is the width-direction central portion and is on the lower side, the step 52*al* being recessed in the X-axis negative direction. The second gears 72 include a pair of gears situated on the width-direction external sides of the step 52*a*1. In the following description, the second gear 72 on the Y-axis negative direction side will be denoted by L, and the second gear 72 on the Y-axis positive direction side will be denoted by R.

The second gears 72L and 72R are fixed on both ends of a shaft 73 extending in the Y-axis direction. The shaft 73 is supported rotatably in a pair of holes (non-illustrated) formed in walls having X-Z planes orthogonal to the step 52*al*. The second gear 72L meshes with the first gear 71 on the Y-axis negative direction side. When the first gear 71 rotates based on the rotational driving force from the cutter gear mechanism 40, the second gear 72L rotates. By the rotation of the second gear 72L being transmitted to the second gear 72R through the shaft 73, the second gear 72R also rotates integrally with the second gear 72L.

The cutter structure 80 is a part that is configured to be moved, by the cutter drive transmission mechanism 70 configured as described above, upward and downward in the Z-axis direction between the cutter guide wall 52*a* and the internal reinforcement sheet metals 55 of the main frame 51. As illustrated in FIG. 5B, the cutter structure 80 includes the movable blade 81, and a holding member 82 holding the movable blade 81.

The movable blade 81 is made of a metal material, and extends by a long distance in the Y-axis direction (width direction) while extending by a short distance in the Z-axis direction (height direction). The movable blade 81 has a blade edge 81*e* on the topmost end, the blade edge 81*e* being able to cut the recording paper L.

The blade edge 81*e* is inclined such that its height gradually decreases from the width-direction external sides to the width-direction central portion, and appears like a roughly V letter-shaped valley in a front view perspective in which it is seen in the X-axis positive direction. The printer 1 includes a fixed blade (non-illustrated) on the thermal head unit opposite to the movable blade 81 across the recording paper L. By the blade edge 81*e* being formed in the V letter shape, the movable blade 81 catches the recording paper L between itself and the fixed blade as it moves upward to the recording paper L, and can hence cut the recording paper L from the external ends of the recording paper L on the width-direction external sides.

The holding member 82 is a member holding the movable blade 81 on the lower side and the rear surface side of the movable blade 81, and is made of, for example, a resin material. The holding member 82 includes a central holding portion 83 holding the width-direction central portion of the movable blade 81, and a pair of rack portions 84 supporting the width-direction external sides of the movable blade 81.

The central holding portion 83 includes a lower end supporting portion 83*a* supporting an edge of the movable blade 81 on the lower side, and a surface supporting portion 83*b* supporting the rear surface of the movable blade 81. The surface supporting portion 83*b* of the central holding portion 83 extends upward from the lower end supporting portion 83*a* such that an upper end of the surface supporting portion 83*b* is situated at a position slightly lower than the blade edge 81*e* of the movable blade 81. The upper end of the surface supporting portion 83*b* is formed in a V letter shape approximately parallel with the blade edge 81*e*, and the blade edge 81*e* slightly projects from the upper end of the surface supporting portion 83*b*.

The pair of rack portions 84 hold the width-direction external surfaces of the movable blade 81 on the upper portions of the rack portions 84, and each include a plurality of teeth 84*t* meshing with the second gears 72 at the lower portions thereof. By being lined in the upper-lower direction, the plurality of teeth 84*t* constitute groups of teeth that can mesh with the respective second gears 72 of FIG. 5A. That is, by the rotational driving force of each second gear 72 being transmitted to the group of teeth of the corresponding rack portion 84, the cutter structure 80 can move upward and downward along the Z-axis direction. For example, the cutter structure 80 moves upward by receiving a normal rotational driving force of the cutter motor 12 transmitted via the cutter gear mechanism 40 and the cutter drive transmission mechanism 70, and moves downward by receiving a reverse rotational driving force of the cutter motor 12.

Figure 6A:
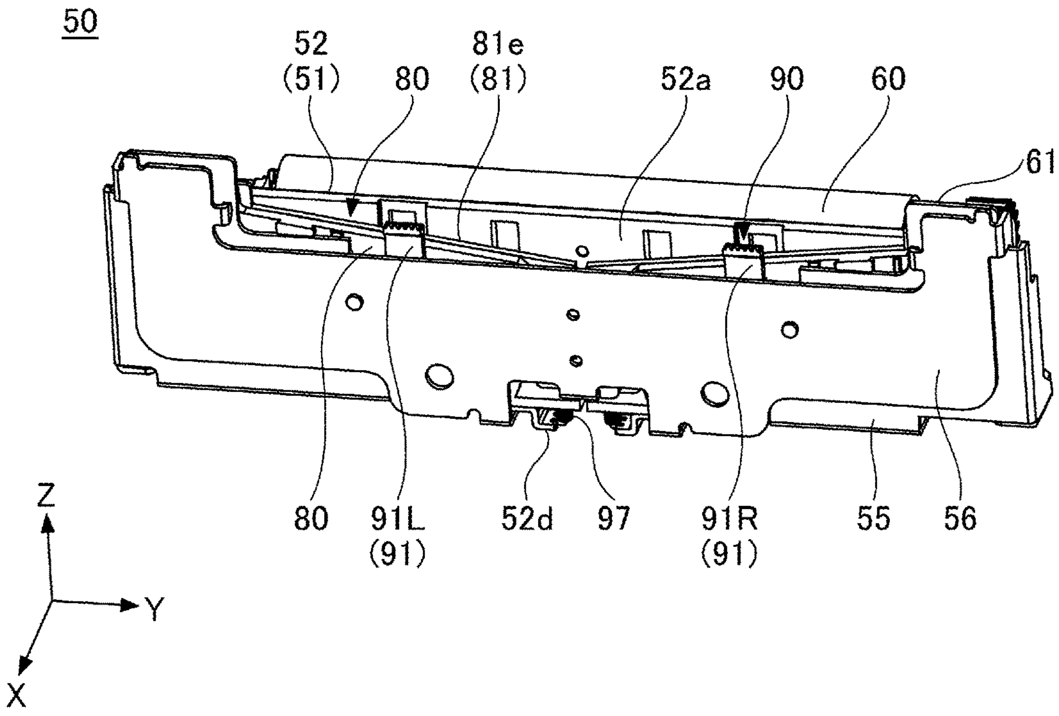
FIG. 6A is an oblique perspective view of a cutter unit seen from an X-axis positive direction side.
Figure 6B:
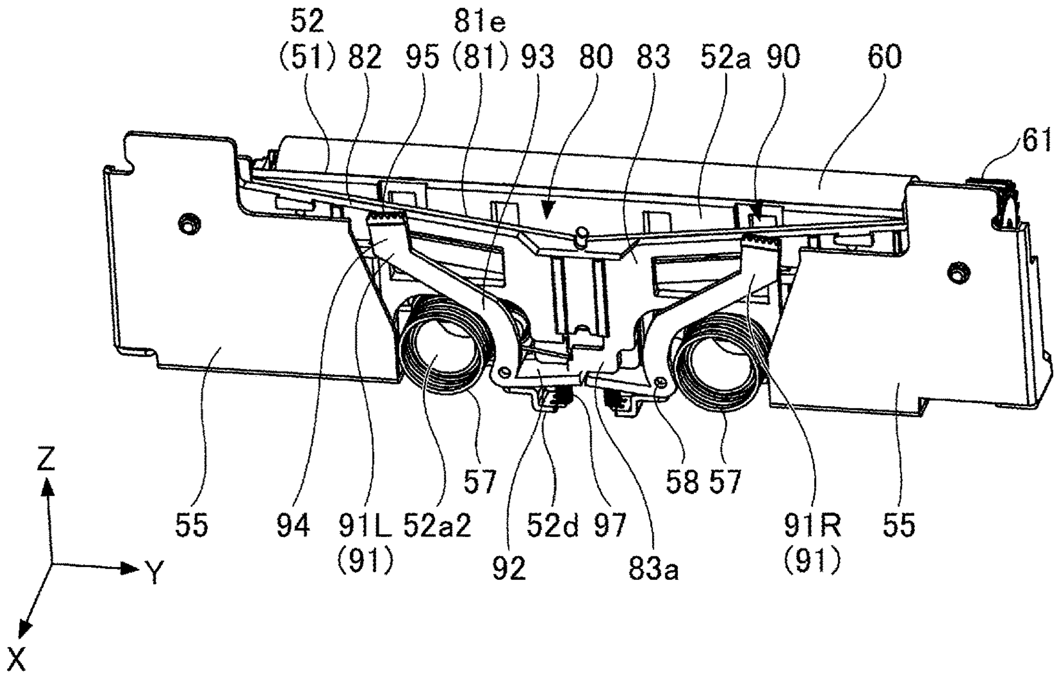
FIG. 6B is an oblique perspective view of a cutter unit seen from an X-axis positive direction side.

FIG. 6A and FIG. 6B are oblique perspective views of the cutter unit seen from the X-axis positive direction side. FIG. 6A is a view of the cutter unit 50 seen from the X-axis positive direction side, and FIG. 6B is a view of the cutter unit 50 from which the external reinforcement sheet metal 56 is detached, and which is seen from the X-axis positive direction side. As illustrated in FIG. 6A and FIG. 6B, the cutter structure 80 is situated between the cutter guide wall 52*a* and the internal reinforcement sheet metals 55 of the main frame 51.

The internal reinforcement sheet metals 55 are formed in an L letter shape in a cross-sectional view along the X-axis direction, and the bottom portion of the internal reinforcement sheet metals 55 are fixed on the bottom portion 52*b* of the main frame 51 (also see FIG. 4). The internal reinforcement sheet metals 55 are supported in a state in which there is a gap between themselves and the cutter guide wall 52*a* in the X-axis direction. The cutter structure 80 can slide only in the upper-lower direction by being situated in the gap between the cutter guide wall 52*a* and the internal reinforcement sheet metals 55.

The internal reinforcement sheet metals 55 are situated on the width-direction external sides of the main frame 51, with a cutout portion in the width-direction central portion. The cutter unit 50 includes the peeling mechanism 90 between the pair of internal reinforcement sheet metals 55. A pair of spring members 57 are situated between the pair of internal reinforcement sheet metals 55. The pair of spring members 57 project by a short distance in the X-axis direction while being supported in a pair of cylinders 52*a*2 (also see FIG. 5A) that are situated in the step 52*al* of the cutter guide wall 52*a*. The pair of spring members 57 impart an elastic force to the external reinforcement sheet metal 56 attached on the external side of the internal reinforcement sheet metals 55. When the cutter unit 50 is mounted on a non-illustrated housing of the printer 1, the external reinforcement sheet metal 56 inhibits backlash of the unit assembly by elastically contacting the housing.

The peeling mechanism 90 includes a pair of peeling arms 91 that are situated in between the pair of spring members 57 and above the spring members 57. The pair of peeling arms 91 are supported on a pair of supporting pins 58 situated on the cutter guide wall 52*a* in between the pair of spring members 57, and can pivot along the Y-Z plane, which is a plane in a direction orthogonal to the direction in which the recording paper L is conveyed. In the following description, the peeling arm 91 on the Y-axis negative direction side will be denoted by L, and the peeling arm 91 on the Y-axis positive direction side will be denoted by R.

Figure 7A:
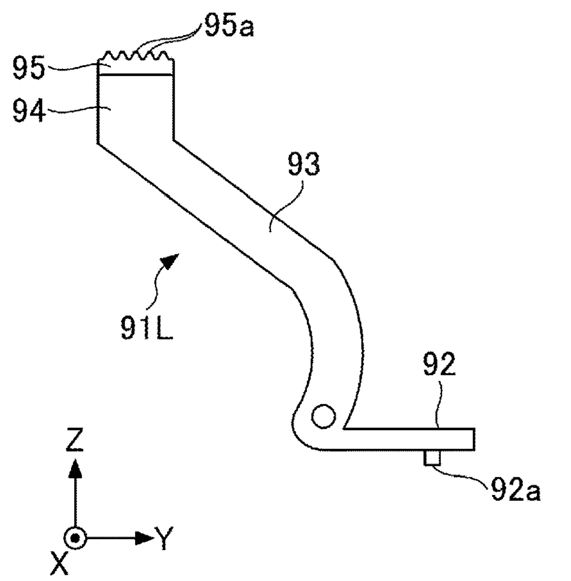
FIG. 7A is a view illustrating a peeling arm.
Figure 7B:
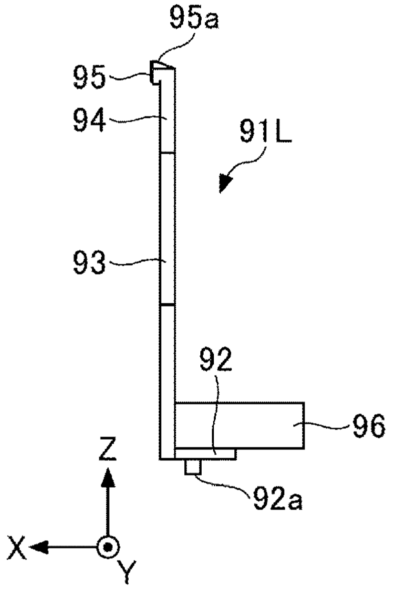
FIG. 7B is a view illustrating a peeling arm.
Figure 7C:
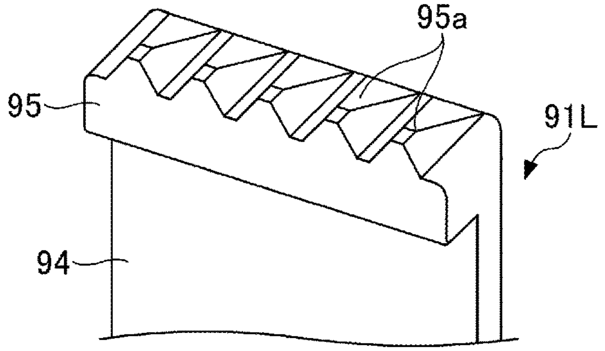
FIG. 7C is a view illustrating a peeling arm.
Figure 7D:
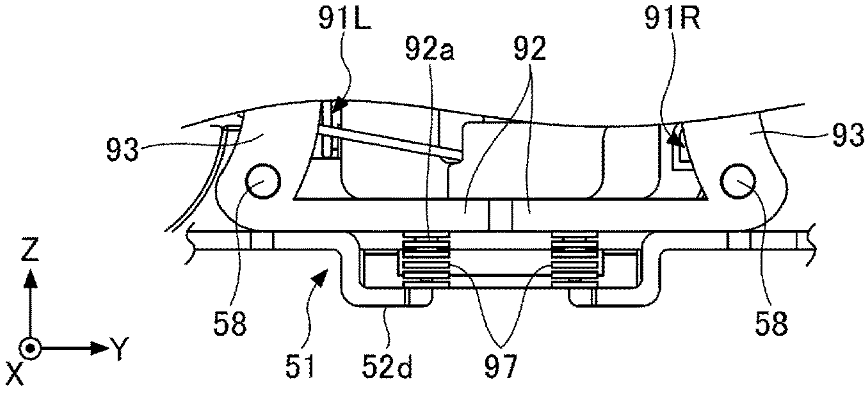
FIG. 7D is a view illustrating a peeling arm.

FIG. 7A to FIG. 7D are views illustrating the peeling arm. FIG. 7A is a front view of the peeling arm 91L. FIG. 7B is a side view of the peeling arm 91L. FIG. 7C is an expanded oblique perspective view of an upper portion of the peeling arm 91L. FIG. 7D is a front view illustrating lower portions of the peeling arms 91L and 91R in their assembled state. Of the pair of peeling arms 91, the peeling arm 91L on the Y-axis negative direction side will be specifically described below, and description of the peeling arm 91R that is formed in a shape symmetrical to it will be omitted.

As illustrated in FIG. 7A and FIG. 7B, the peeling arm 91L includes a receiving plate portion 92, an extending portion 93, a joining portion 94, and a contacting portion 95. The receiving plate portion 92, the extending portion 93, the joining portion 94, and the contacting portion 95 are formed integrally, and are mutually continuous.

The receiving plate portion 92 is formed in a rectangular shape that extends in the X-Y axis direction and has a thickness in the Z-axis direction. By projecting from the extending portion 93 in the X-axis negative direction, the receiving plate portion 92 is situated to face the lower end supporting portion 83*a* at the lower side of the holding member 82 (also see FIG. 6B). By the lower end supporting portion 83*a* contacting the receiving plate portion 92 in a standby state in which the cutter structure 80 is positioned at the lower side, the receiving plate portion 92 is depressed downward. In this way, the peeling arm 91 is maintained in the attitude in the standby state.

The receiving plate portion 92 includes a projection 92*a* on the lower surface of the receiving plate portion 92 lopsidedly to an end of the peeling arm 91L, and, as illustrated in FIG. 7D, is configured to receive a pushing force of an elastic member 97 on the lower surface of the receiving plate portion 92. The projection 92*a* is inserted into a hole in the elastic member 97. The lower end of the elastic member 97 is supported by a protruding piece 52*d* that protrudes from the lower end of the cutter guide wall 52*a* in the X-axis positive direction.

When the peeling arm 91 is in the standby state in which the peeling arm 91 is depressed by the central holding portion 83, the elastic member 97 is compressed in the axial direction by the receiving plate portion 92 and elastically biases the receiving plate portion 92. When the central holding portion 83 moves upward from the standby state, the elastic member 97 elastically extends and pushes the receiving plate portion 92 upward. Hence, the peeling arm 91 can smoothly pivot as the central holding portion 83 moves upward. The peeling mechanism 90 does not need to include the elastic member 97, and the peeling arm 91 may be designed to pivot by the weights of, for example, the upper side of the extending portion 93, the joining portion 94, and the contacting portion 95.

As illustrated in FIG. 7A and FIG. 7B, the lower end of the extending portion 93 is joined to an end portion of the receiving plate portion 92 opposite from the projection 92*a*. The extending portion 93 extends from the receiving plate portion 92 upward and in the Y-axis negative direction. The extending portion 93 is curved in order to bypass the spring member 57 described above. The extending portion 93 includes an axially supported tube 96 near a portion at which it is joined to the receiving plate portion 92. The axially supported tube 96 projects from the extending portion 93 to the rear surface side, and the supporting pin 58 described above is inserted into a hole in the axially supported tube 96.

The joining portion 94 is joined to the upper end of the extending portion 93, and extends from the extending portion 93 upward by a short distance. The width of the joining portion 94 is greater than the width of the extending portion 93. The contacting portion 95 is joined to the upper end of the joining portion 94.

As illustrated in FIG. 7C, the contacting portion 95 extends from the joining portion 94 in the X-axis positive direction, and appears like a rectangular shape in a top view perspective. The contacting portion 95 has a plurality of (five in the illustrated example) protrusions 95*a* on the uppermost end thereof along the Y-axis direction. Each protrusion 95*a* is formed in an approximately triangular shape in the front view perspective, and the apex of the approximately triangular shape is formed with a sufficiently short width. The apex of each protrusion 95*a* can contact the lower surface of the recording paper L, and directly contacts the adhesive layer in a case where the recording paper L is a linerless label.

That is, by the contacting portion 95 contacting and supporting the lower surface of the recording paper L, the peeling arm 91L peels the recording paper L adhering to the movable blade 81, in a case where the recording paper L is a linerless label. Hereinafter, the operations of the pair of peeling arms 91L and 91R in a case where the recording paper L is a linerless label will be described with reference to FIG. 8A to FIG. 9B.

Figure 8A:
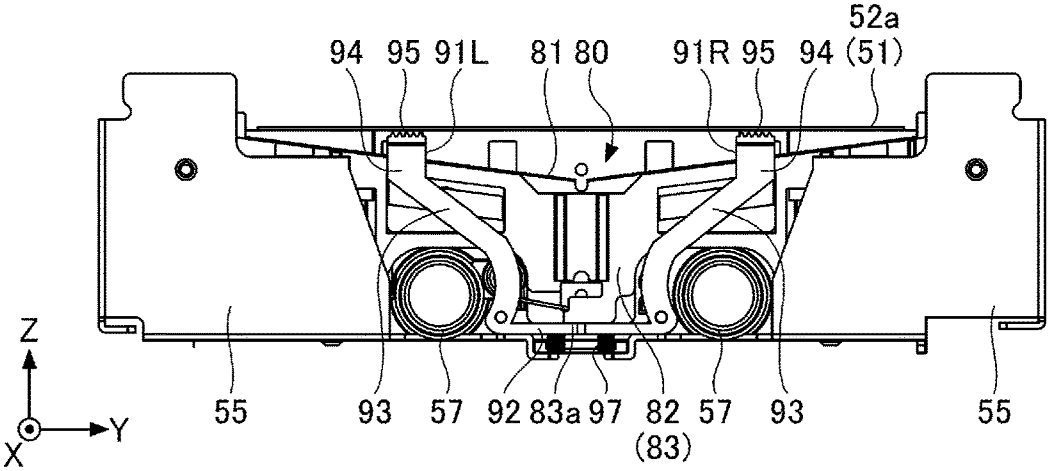
FIG. 8A is a front view illustrating operations of a cutter structure and a peeling mechanism.
Figure 8B:
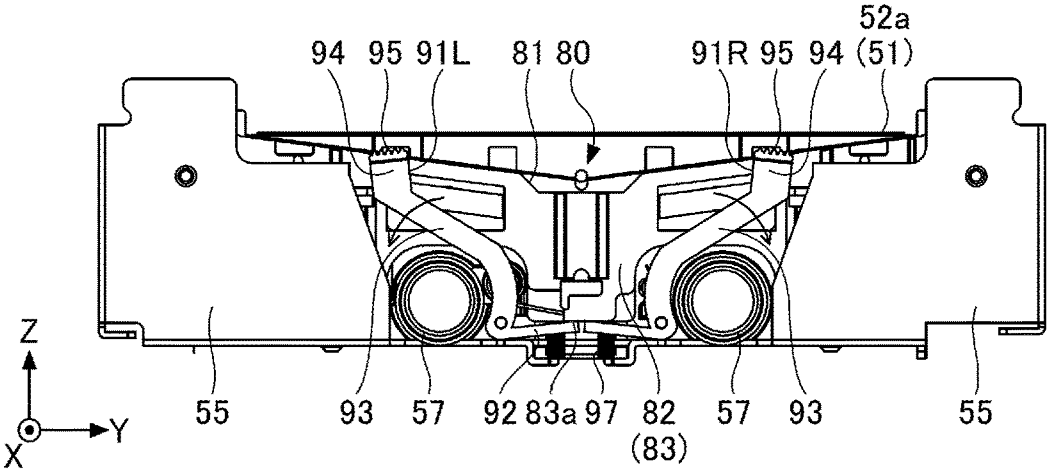
FIG. 8B is a front view illustrating operations of a cutter structure and a peeling mechanism.
Figure 8C:
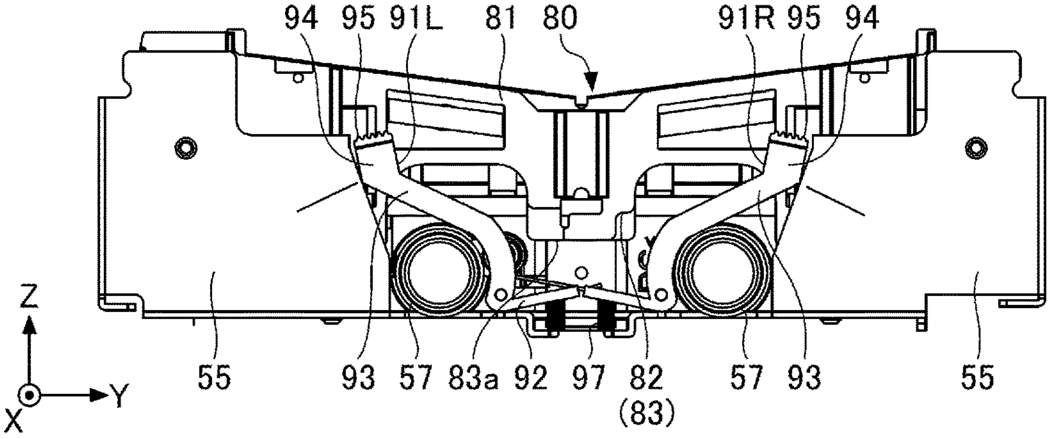
FIG. 8C is a front view illustrating operations of a cutter structure and a peeling mechanism.
Figure 9A:
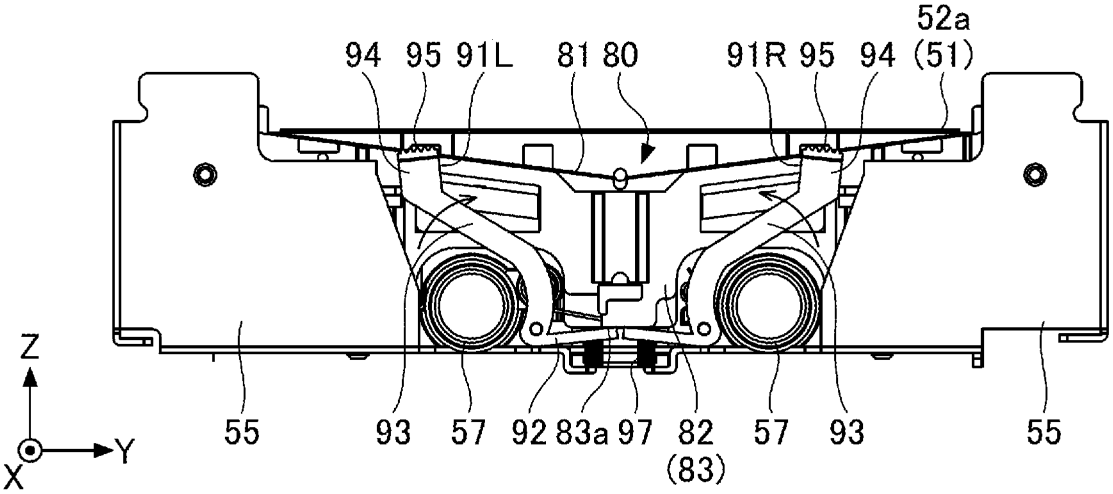
FIG. 9A is a front view illustrating operations of a cutter structure and a peeling mechanism.
Figure 9B:
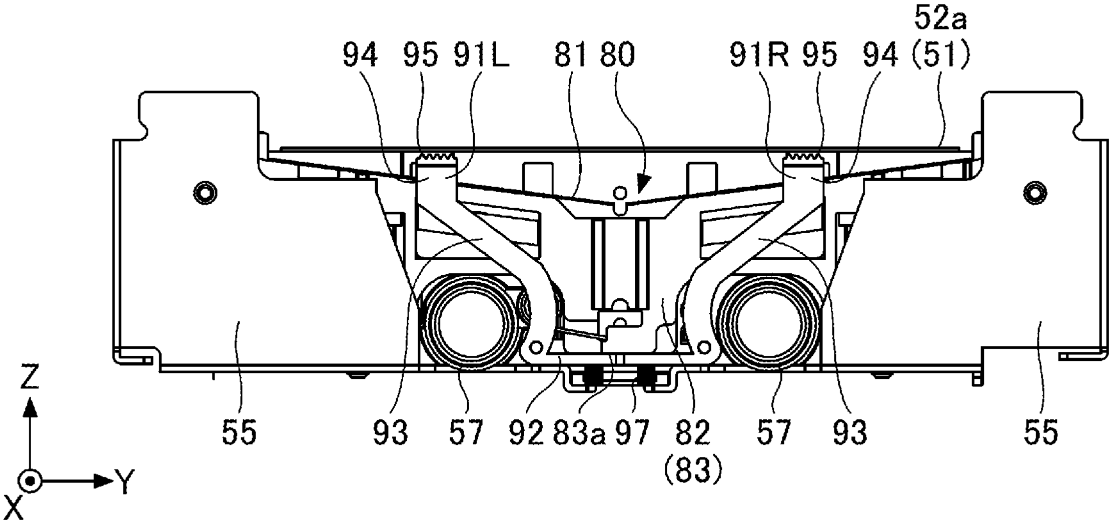
FIG. 9B is a front view illustrating operations of a cutter structure and a peeling mechanism.

FIG. 8A to FIG. 8C are front views illustrating operations of the cutter structure 80 and the peeling mechanism 90. FIG. 8A is a view of a first operation, FIG. 8B is a view of a second operation and FIG. 8C is a view of a third operation. FIG. 9A and FIG. 9B are front views illustrating operations of the cutter structure 80 and the peeling mechanism 90. FIG. 9A is a view of a fourth operation, and FIG. 9B is a view of a fifth operation. As illustrated in FIG. 8A, in a state in which the cutter structure 80 is positioned in the standby position on the Z-axis negative direction side, the pair of peeling arms 91L and 91R are positioned at the peeling positions with the receiving plate portions 92 depressed by the central holding portion 83. At the peeling positions, the pair of peeling arms 91L and 91R assume peeling attitudes by which the recording paper L is separated from the movable blade 81. That is, at the peeling positions, the upper surfaces of the contacting portions 95 are positioned at positions higher than the movable blade 81. Moreover, in the state in which the pair of peeling arms 91L and 91R are positioned at the peeling positions, the contacting portions 95 are parallel with the upper end of the cutter guide wall 52*a*.

When the cutter structure 80 starts to move upward as illustrated in FIG. 8B, the pair of peeling arms 91L and 91R start moving outward to the width-direction external sides along with this upward movement. That is, the receiving plate portions 92 of the peeling arms 91L and 91R that are on the width-direction internal side are biased upward by the elastic members 97. Hence, the extending portions 93, the joining portions 94, and the contacting portions 95 are displaced in a direction to widen to the width-direction external sides from the base point of the supporting pins 58.

As illustrated in FIG. 8C, the movable blade 81 of the cutter structure 80 moves upward to a cutting position at which it cuts the recording paper L (see FIG. 2). Here, the movable blade 81 moves to a position higher than the contacting portions 95 of the pair of peeling arms 91L and 91R. Meanwhile, the pair of peeling arms 91L and 91R move to retreated positions at which the contacting portions 95 are maximumly widened to the width-direction external sides. The retreated positions are positions at which the side surfaces of the extending portions 93 contact the internal reinforcement sheet metals 55, and this restricts pivoting of the pair of peeling arms 91. In other words, when the movable blade 81 moves from the standby position to the cutting position, the pair of peeling arms 91L and 91R are displaced from the peeling position to the retreated positions.

As illustrated in FIG. 9A, the cutter structure 80 starts to move downward after it has reached the cutting position. By the central holding portion 83 depressing the receiving plate portions 92 of the pair of peeling arms 91L and 91R downward along with this downward movement, the pair of peeling arms 91L and 91R start moving inward to the internal side from the retreated positions. Then, when the movable blade 81 has moved downward to a certain extent, the contacting portions 95 of the pair of peeling arms 91L and 91R that have been pivoting come to be higher than the blade edge 81*e* of the movable blade 81. Hence, the contacting portions 95 can contact the recording paper L adhering to the movable blade 81 and peel the recording paper L from the movable blade 81.

As illustrated in FIG. 9B, by the cutter structure 80 continuing to move further downward and returning to the standby position, the pair of peeling arms 91L and 91R also return to the peeling positions at which the receiving plate portions 92 are depressed by the central holding portion 83. In other words, as the movable blade 81 moves from the cutting position to the standby position, the pair of peeling arms 91L and 91R are displaced from the retreated positions to the peeling positions.

Here, the contacting portions 95 become parallel with the upper end of the cutter guide wall 52*a*, and enter a state of softly supporting the peeled recording paper L on the apexes of the protrusions 95*a* such that the recording paper L can be easily peeled off. Hence, the printer 1 can easily take out the recording paper L from the pair of peeling arms 91L and 91R by withdrawing the cut recording paper L with a weak force. As a result, the printer 1 can favorably inhibit a jam of the recording paper L in the cutter unit 50.

Figure 10A:
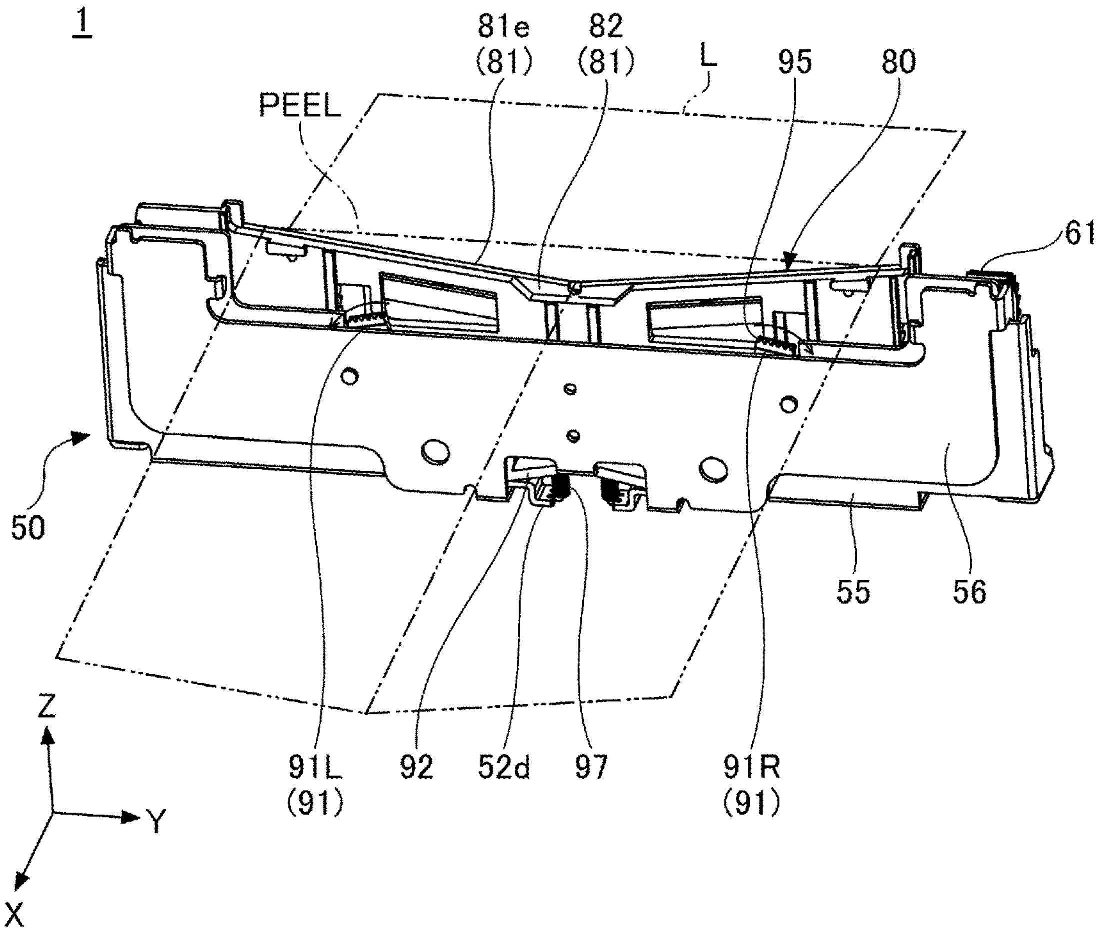
FIG. 10A is a view illustrating an operation of a cutter unit.
Figure 10B:
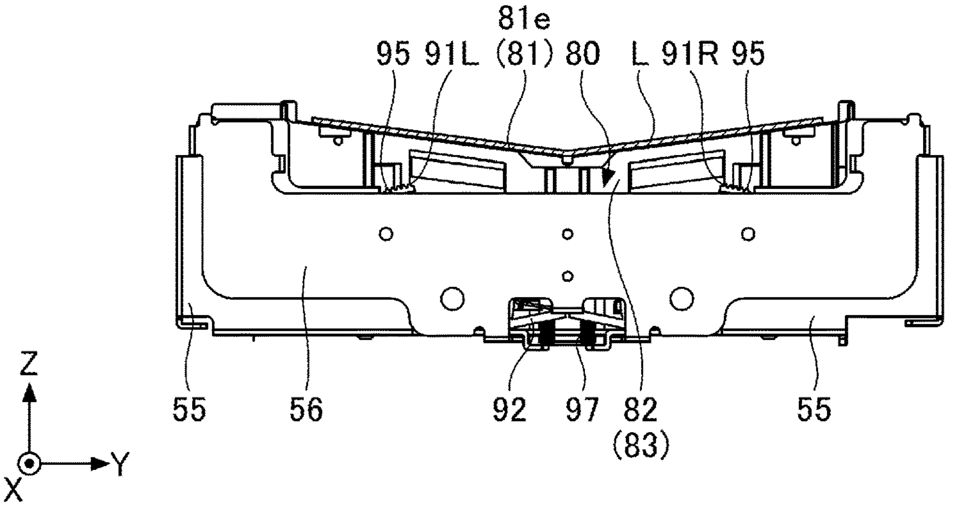
FIG. 10B is a view illustrating an operation of a cutter unit.
Figure 11A:
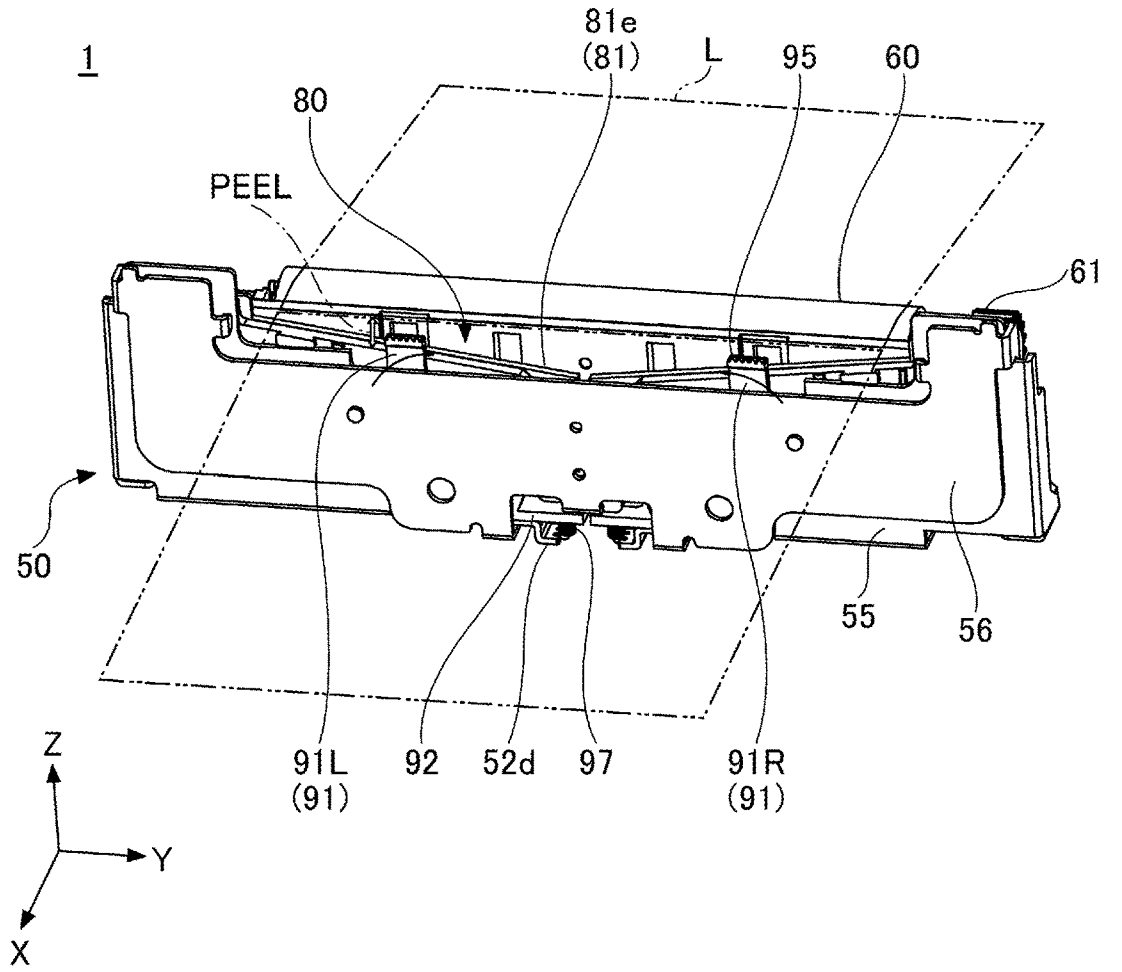
FIG. 11A is a view illustrating an operation of a cutter unit.
Figure 11B:
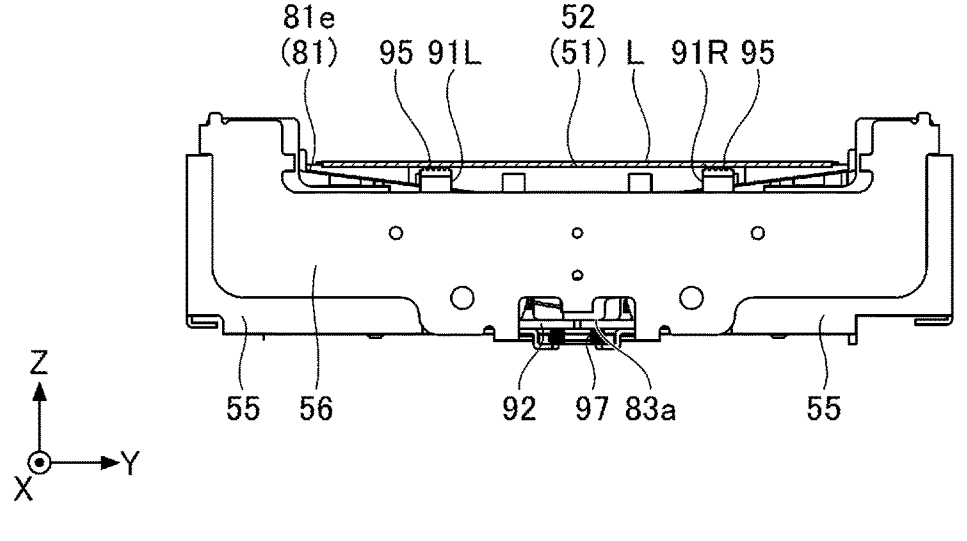
FIG. 11B is a view illustrating an operation of a cutter unit.

The cutter unit 50 and the printer 1 according to the present embodiment are basically configured as described above. Operations in a case where the recording paper L is a linerless label will be described below with reference to FIG. 10A to FIG. 11B. FIG. 10A and FIG. 10B are views illustrating the operations of the cutter unit 50. FIG. 10A is a first oblique perspective view, and FIG. 10B is a first front view illustrating the operations of the cutter structure 80 and the peeling mechanism 90. FIG. 11A and FIG. 11B are views illustrating the operations of the cutter unit 50. FIG. 11A is a second oblique perspective view, and FIG. 11B are a second front view illustrating the operations of the cutter structure 80 and the peeling mechanism 90.

As illustrated in FIG. 10A, after conveying the recording paper L by a predetermined length, the printer 1 causes the cutter unit 50 to perform a cutting operation in order to remove the X-axis positive direction side of the recording paper L. Here, the printer 1 transmits a normal rotational driving force of the cutter motor 12 described above (see FIG. 1) to the cutter structure 80 via the cutter gear mechanism 40 and the cutter drive transmission mechanism 70 (also see FIG. 4, and FIG. 5A and FIG. 5B). Hence, the holding member 82 of the cutter structure 80 moves upward along the Z-axis positive direction, and the movable blade 81 held by the holding member 82 also moves upward along with this.

By moving upward from the standby position to the cutting position, the cutter structure 80 cuts the recording paper L, which the cutter structure 80 is facing above the movable blade 81. The blade edge 81*e* of the movable blade 81 starts to cut the recording paper L from the external ends of the recording paper L, as it has the V letter shape as described above. Hence, the adhesive layer on the lower surface of the recording paper L after being cut adheres to the movable blade 81. FIG. 10A and FIG. 10B illustrate the recording paper L that is deformed in a V letter shape due to the adhesion of the movable blade 81.

As described above, the pair of peeling arms 91L and 91R of the peeling mechanism 90 pivot from the peeling attitudes to the width-direction external sides along with the upward movement of the cutter structure 80. Hence, as illustrated in FIG. 10B, the pair of contacting portions 95 come to assume attitudes inclined with respect to each other at the retreated positions, and come to the positions at which the pair of contacting portions 95 are maximumly distanced from each other.

After the recording paper L is cut, the printer 1 transmits a reverse rotational driving force of the cutter motor 12 described above (see FIG. 1) to the cutter structure 80 via the cutter gear mechanism 40 and the cutter drive transmission mechanism 70 (also see FIG. 4, and FIG. 5A and FIG. 5B). Hence, as illustrated in FIG. 11A, the holding member 82 of the cutter structure 80 moves downward, and the movable blade 81 held by the holding member 82 also moves downward along with this. That is, the cutter structure 80 moves downward from the cutting position to the standby position.

Then, while the cutter structure 80 is moving downward, the lower end supporting portion 83*a* depresses the receiving plate portions 92 of the pair of peeling arms 91L and 91R downward. Along with the downward movement of the receiving plate portions 92, the pair of peeling arms 91L and 91R pivot and move their contacting portions 95 to the width-direction internal side. While the contacting portions 95 are moving to the width-direction internal side, the contacting portions 95 contact the lower surface of the recording paper L adhering to the movable blade 81. That is, as illustrated in FIG. 11B, as the contacting portions 95 move to the positions higher than the blade edge 81*e*, the recording paper L adhering to the movable blade 81 is passed on to the contacting portions 95.

The pair of contacting portions 95 can peel the recording paper L away upward by moving relative to each other to the width-direction internal side and upward. Then, when the contacting portions 95 come close to the width-direction central portion, they are at upward positions greatly apart from the movable blade 81 that has moved downward. Hence, in the state of having returned to the peeling attitudes, the pair of peeling arms 91L and 91R can reliably peel the recording paper L from the movable blade 81.

The pair of peeling arms 91L and 91R assuming the peeling attitudes are in the state of softly holding the cut recording paper L on the X-axis positive direction side on the contacting portions 95. By the peeling arms 91L and 91R holding the recording paper L in this way, it is possible to inhibit the cut end portion of the recording paper L from being in a free state. Hence, the printer 1 can inhibit the recording paper L, which is in the free state, from adhering to other components of the printer 1.

Figure 12:
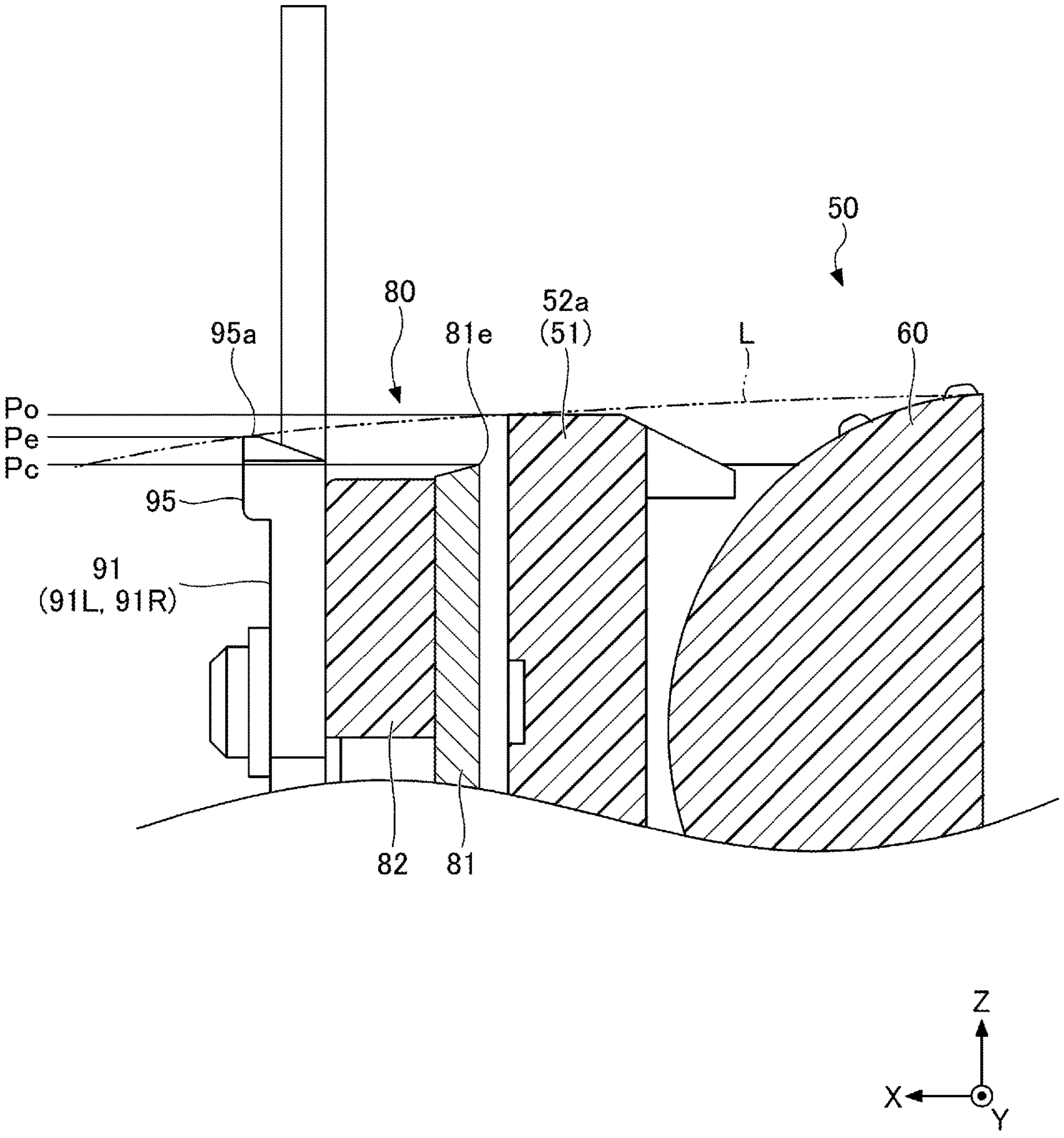
FIG. 12 is a cross-sectional side view illustrating a height relationship among components of a cutter unit.

FIG. 12 is a cross-sectional side view illustrating a height relationship among the components (the platen 60, the cutter guide wall 52*a*, the movable blade 81, and the peeling arms 91) of the cutter unit 50. The reference sign Po displayed in FIG. 12 indicates a height position of the upper end of a conveying passage of the housing (non-illustrated) when conveying the recording paper L. For example, by the height position Po of the upper end of the conveying passage being the same as the position of the upper end of the cutter guide wall 52*a* of the cutter unit 50, the printer 1 can inhibit the recording paper L from wrinkling upward.

On the other hand, the peeling arms 91L and 91R at the peeling positions are set such that the height positions Pe of the contacting portions 95 are at positions that are lower than the height position Po of the upper end of the conveying passage and higher than the height position of the lower end of the conveying passage. However, the height positions Pe of the contacting portions 95 are set to be higher than the height position Pc of the blade edge 81*e* when the movable blade 81 is at the standby position. As described above, the movable blade 81 is formed in a V letter shape, and the height position Pc of the blade edge 81*e* means the positions of the blade edge 81*e* at the width-direction external sides, which are the highest along the full range in the width direction. Hence, the contacting portions 95 are more distanced from the blade edge 81*e* at the width-direction central portion of the movable blade 81.

By the height positions Pe of the contacting portions 95 being higher than the height position Pc of the blade edge 81*e*, the printer 1 can reliably peel the recording paper L from the movable blade 81 even when the recording paper L is a linerless label. That is, by being supported by the contacting portions 95, the recording paper L is supported such that a portion of the recording paper L that is on the rear surface side with respect to the contacting portions 95 floats obliquely. Because the entirety of the movable blade 81 is positioned at a position sufficiently distanced from the recording paper L, the supported recording paper L can avoid contacting the movable blade 81.

As described above, by including the peeling mechanism 90 that moves in a direction opposite to the moving direction of the movable blade 81, the cutter unit 50 and the printer 1 according to the present embodiment can stably peel the recording paper L adhering to the movable blade 81. That is, because the cutter unit 50 can favorably inhibit adhesion of the recording paper L to the movable blade 81, it is possible to significantly reduce the occurrence of a jam of the recording paper L.

The cutter unit 50 and the printer 1 according to the present embodiment are not limited to the embodiment described above, and may include various modified examples. For example, in the embodiment described above, a case of cutting a linerless label including no mat board has been described. However, the technique of the present disclosure may be applied to a cutter unit 50 and a printer 1 configured to cut recording paper L in which a label and a mat board are integrated. When cut by the movable blade 81, the recording paper L in which a label and a mat board are integrated also has a likelihood that the cut portion adheres to the movable blade 81. The peeling mechanism 90 configured as described above can peel the cut portion adhering to the movable blade 81.

For example, the peeling mechanism 90 is not limited to a configuration including a pair of peeling arms 91, and may include one peeling arm or may include three or more peeling arms. Moreover, the shape of the contacting portions 95 of the peeling arms 91 is not particularly limited, and the contacting portions 95 may be longer than, for example, the Y-axis direction length of the receiving plate portions 92.

Figure 13A:
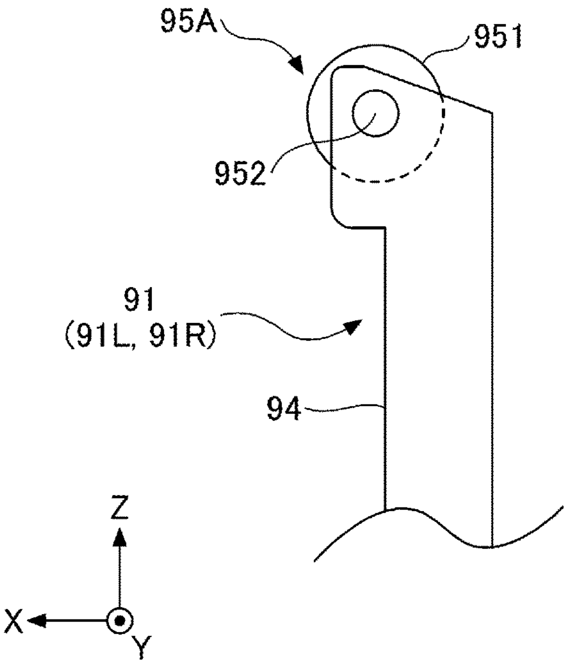
FIG. 13A is a side view illustrating a contacting portion of a peeling arm according to a modified example.
Figure 13B:
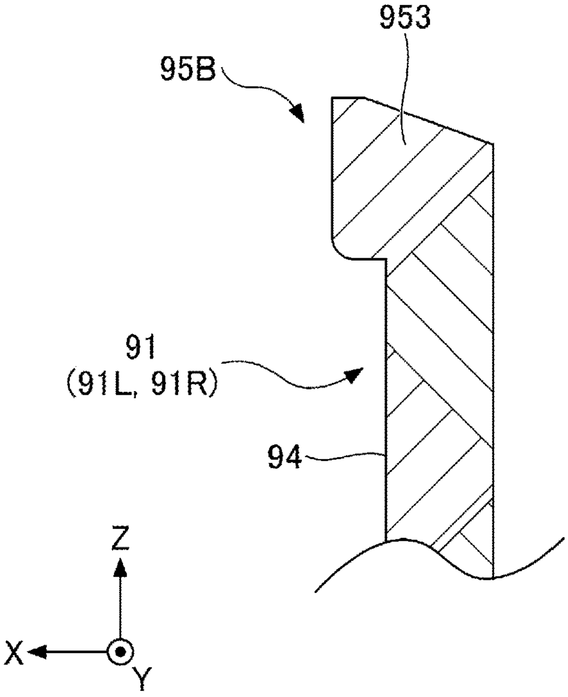
FIG. 13B is a side view illustrating a contacting portion of a peeling arm according to a modified example.

FIG. 13A and FIG. 13B are side views of contacting portions 95A and 95B of a peeling arm 91 according to modified examples. FIG. 13A is a view of the contacting portion 95A according to a first modified example. FIG. 13B is a view of the contacting portion 95B according to a second modified example. The contacting portion 95A of the peeling arm 91 is different from the contacting portion 95 according to the embodiment described above in that the contacting portion 95A employs a roller 951 instead of the plurality of protrusions 95*a* (see FIG. 7C) as in the first modified example illustrated in FIG. 13A. The roller 951 is rotatably supported on a shaft portion 952 situated in the contacting portion 95A. Hence, the peeling arm 91 can hold the recording paper L peeled from the movable blade 81 on the roller 951. The roller 951 can facilitate smoother peeling of the recording paper L from the contacting portion 95A, by its rotating when the cut recording paper L is drawn out.

As in the second modified example illustrated in FIG. 13B, the contacting portion 95B of the peeling arm 91 may include a surface treated portion 953, which results from surface-treating the contacting portion 95B itself. The surface treated portion 953 may be, for example, a coating of a low-friction material for adjusting the surface roughness of the contacting portion 95B. By including the surface treated portion 953, the contacting portion 95B can hold the recording paper L in a state of reducing the adhesive force of the recording paper L. The surface treated portion 953 may be applied to the configuration including the plurality of protrusions 95*a*, or may be applied to one end surface that is continuous in the Y-axis direction and does not include the plurality of protrusions 95*a*.

Figure 14A:
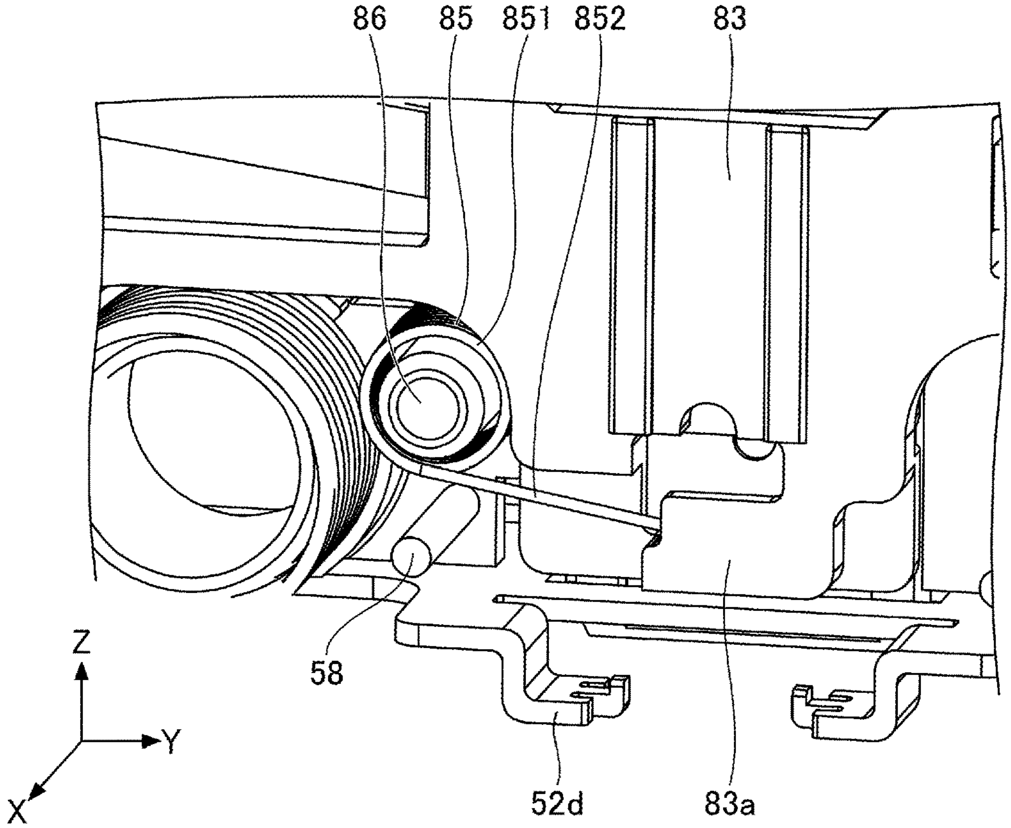
FIG. 14A is a view illustrating a biasing member according to a modified example.
Figure 14B:
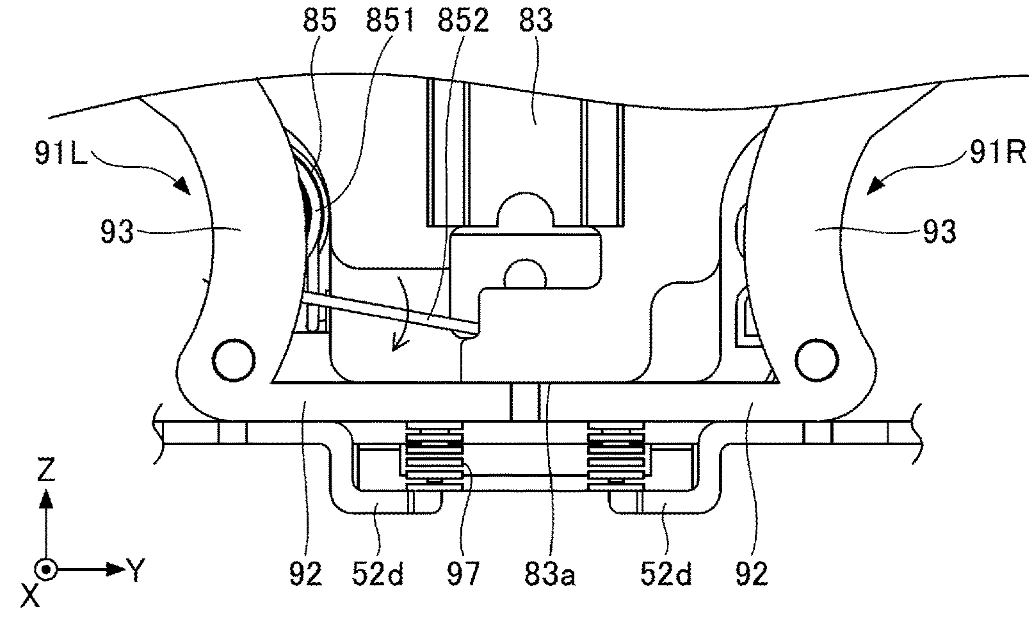
FIG. 14B is a view illustrating a biasing member according to a modified example.

FIG. 14A and FIG. 14B are views illustrating a biasing member 85 according to a modified example. FIG. 14A is an oblique-perspective expanded view illustrating a portion at which a biasing member 85 is situated, and FIG. 14B is a front view illustrating the operation of the biasing members 85. As illustrated in FIG. 14A and FIG. 14B, the cutter unit 50 may include the biasing members 85 configured to elastically bias the cutter structure 80 downward. For example, a torsion spring including a coil portion 851 and a rod portion 852 projecting from the coil portion 851 may be used as the biasing member 85. In this case, with the coil portion 851 attached on a holding protrusion 86 situated on the cutter guide wall 52*a*, the rod portion 852 depresses the holding member 82 downward. By the biasing member 85 depressing the holding member 82 downward, the receiving plate portion 92 of each peeling arm 91 can be depressed, making it possible to assist the pivoting of each peeling arm 91 when returning to the peeling position. Hence, the cutter unit 50 can facilitate more stable pivoting of each peeling arm 91. The technical idea and the effects of the present disclosure, which have been described in the embodiment described above, will be summarized below.

A first aspect of the present disclosure is the cutter unit 50 configured to cut the recording paper L that is conveyed, and includes: the movable blade 81 that can advance toward or retract from the recording paper L and is configured to cut the recording paper L when it advances; and the peeling mechanism 90 including the contacting portion 95 configured to move in a direction opposite to a direction of advancement or retraction of the movable blade 81 and contact the recording paper L.

According to the above, the peeling mechanism 90 of the cutter unit 50 moves the contacting portion 95 in the direction of advancement of the movable blade 81 during retraction of the movable blade 81. Hence, even if a linerless label has adhered to the movable blade 81, the peeling mechanism 90 can apply an external force to the linerless label by moving. Hence, the cutter unit 50 can stably inhibit adhesion of the linerless label to the movable blade 81.

The peeling mechanism 90 includes the peeling arms 91 that can move in a direction opposite to the direction of advancement or retraction of the movable blade 81. The peeling arms 91 are displaced between peeling positions, which are positions of contact with the recording paper L, and retreated positions, which are reached by retreating in a direction to become farther from the recording paper L than when the peeling arms 91 are at the peeling positions. Hence, the cutter unit 50 can inhibit adhesion of a linerless label by means of the peeling arms 91 that come to the peeling positions.

The peeling arms 91 are displaced from the peeling positions to the retreated positions along with advancement of the movable blade 81, whereas they are displaced from the retreated positions to the peeling positions along with retraction of the movable blade 81. Hence, the cutter unit 50 can favorably peel the linerless label from the movable blade 81 by means of the peeling arms 91, when the peeling arms 91 are displaced to the peeling positions from the retreated position.

When displaced between the peeling positions and the retreated positions, the peeling arms 91 pivot along a plane that is in a direction orthogonal to the direction in which the recording paper L is conveyed. By the peeling arms 91 pivoting in the direction orthogonal to the direction in which the recording paper L is conveyed, the space of the cutter unit 50 in the direction in which the recording paper L is conveyed can be reduced to the minimum possible.

The cutter unit also includes the holding member 82 holding the movable blade 81. The peeling arms 91 are maintained at the peeling positions by being contacted by the holding member 82 in the state of being positioned at the peeling positions, and are able to be displaced to the retreated positions based on the holding member 82 moving in a direction to disconnect from the portions of contact. Hence, the cutter unit 50 can easily maintain the attitudes of the peeling arms 91 at the peeling positions.

The cutter unit also includes the elastic members 97 configured to push the peeling arms 91 when the peeling arms 91 are displaced from the peeling positions to the retreated positions. Hence, the cutter unit 50 can actively move the peeling arms 91 from the peeling positions to the retreated positions as the holding member 82 moves in a direction to become apart from the lower end of the main frame 51.

The peeling arms 91 are displaced from the retreated positions to the peeling positions, by the holding member 82 moving in a direction to become closer to the portions of contact at which the peeling arms 91 will contact the holding member 82 and pushing the portions of the peeling arms 91 thus contacted. The cutter unit includes the biasing members 85 configured to push the holding member 82 in the direction to become closer to the portions of contact when the peeling arms 91 are to be displaced from the retreated positions to the peeling positions. By means of the biasing members 85, the cutter unit 50 can facilitate a more stable move of the holding member 82 in the direction to become closer to the portions of contact of the peeling arms 91.

At the peeling positions, the contacting portions 95 are closer to the recording paper L than is the movable blade 81. At the retreated positions, the contacting portions 95 are farther from the recording paper L than is the movable blade 81. Hence, the cutter unit 50 can favorably peel the linerless label by means of the contacting portions 95 of the peeling arms 91 that are closer to the linerless label than is the movable blade 81.

At the peeling positions, the contacting portions 95 are disposed between the upper end of the holding member 82 holding the movable blade 81 and the upper end of the supporting element supporting the holding member 82. When the contacting portions 95 are at the peeling positions, the movable blade 81 is farther from the recording paper L than are the platen 60 conveying the recording paper L and the contacting portions 95. Hence, the cutter unit 50 can peel the linerless label from the movable blade 81 while enabling smooth conveyance of the linerless label.

The contacting portions 95 include the plurality of protrusions 95*a* at a portion thereof facing the recording paper L. Hence, the contacting portions 95 can peel the linerless label while also making the linerless label after being peeled adhere thereto with a weak force.

The contacting portions 95A include the rollers 951 that are situated rotatably and can contact the recording paper L. Hence, the contacting portions 95A make it possible to draw out the adhering linerless label easily by rotation of the rollers 951.

The contacting portions 95B include the surface treated portions 953 that reduce the adhering force on the recording paper L. Also in this case, the contacting portions 95B can make the linerless label after being peeled adhere thereto with a suitable adhering force, and enable the recording paper L to be drawn out easily.

The peeling mechanism 90 include the pair of peeling arms 91 on the same plane. The peeling positions are the positions at which the pair of peeling arms 91 come closest to each other, and the retreated positions are the positions at which the pair of peeling arms 91 are farthest from each other. Hence, the peeling mechanism 90 can more stably peel the linerless label by means of the pair of peeling arms 91.

The cutter unit also includes the supporting element (main frame 51) supporting the movable blade 81 movably and the peeling mechanism 90 movably. The lower end portions of the pair of peeling arms 91 are at positions at which they adjoin each other. The pair of peeling arms 91 extend in a direction to become farther from each other at more upward portions thereof than at the lower end portions, and peel the linerless label from the movable blade 81 at their upper end portions. Hence, the pair of peeling arms 91 can easily peel the linerless label, starting from the external ends of the linerless label on both sides.

The blade edge 81*e* of the movable blade 81 configured to cut the recording paper L is formed in a V letter shape along a direction orthogonal to the direction in which the recording paper L is conveyed. The V letter-shaped movable blade 81 can reliably cut the recording paper L, and the pair of peeling arms 91L and 91R can easily peel the linerless label.

A second aspect of the present disclosure is the printer 1 including: the cutter unit 50 configured to cut the recording paper L; and the actuating unit (the cutter motor 12 and the cutter gear mechanism 40) configured to actuate the cutter unit 50, the printer 1 being configured to perform printing while conveying the recording paper L. The cutter unit 50 includes: the movable blade 81 that can advance toward or retract from the recording paper L and is configured to cut the recording paper L when it advances; and the peeling mechanism 90 including the contacting portion 95 configured to move in a direction opposite to a direction of advancement or retraction of the movable blade 81 and contact the recording paper L. Also in this case, the printer 1 can inhibit adhesion of the linerless label to the movable blade 81.

All examples and conditional language provided herein are intended for the purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cutter unit configured to cut recording paper that is conveyed, the cutter unit comprising:
- a movable blade that can advance toward or retract from the recording paper and is configured to cut the recording paper when the movable blade advances; and
- a peeling mechanism including a contacting portion configured to move in a direction opposite to a direction of advancement or retraction of the movable blade and contact the recording paper,
- wherein the peeling mechanism is displaced between a peeling position, which is a position of contact with the recording paper, and a retreated position, which is reached by retreating in a direction to become farther from the recording paper than when the peeling mechanism is at the peeling position.

2. The cutter unit according to claim 1,
- the peeling mechanism further including a peeling arm that can move in the direction opposite to the direction of advancement or retraction of the movable blade.

3. The cutter unit according to claim 2,
- wherein the peeling arm is displaced from the peeling position to the retreated position along with advancement of the movable blade, and is displaced from the retreated position to the peeling position along with retraction of the movable blade.

4. The cutter unit according to claim 2,
- wherein when displaced between the peeling position and the retreated position, the peeling arm pivots along a plane that is in a direction orthogonal to a direction in which the recording paper is conveyed.

5. The cutter unit according to claim 2, further comprising:
- a holding member holding the movable blade,
- wherein the peeling arm is maintained at the peeling position by being contacted by the holding member in a state of being positioned at the peeling position, and is able to be displaced to the retreated position based on the holding member moving in a direction to become out of contact with the peeling arm.

6. The cutter unit according to claim 2,
- wherein at the peeling position, the contacting portion is closer to the recording paper than is the movable blade, and
- at the retreated position, the contacting portion is farther from the recording paper than is the movable blade.

7. The cutter unit according to claim 6,
- wherein at the peeling position, the contacting portion is disposed between an upper end of a holding member holding the movable blade and an upper end of a supporting element supporting the holding member, and when the contacting portion is at the peeling position, the movable blade is farther from the recording paper than are a platen configured to convey the recording paper and the contacting portion.

8. The cutter unit according to claim 2, wherein the peeling mechanism includes a pair of peeling arms on a same plane, each of the pair of peeling arms being the peeling arm, the peeling position is a position at which the pair of peeling arms come closest to each other, and the retreated position is a position at which the pair of peeling arms are farthest from each other.

9. The cutter unit according to claim 8, further comprising:

a supporting element supporting the movable blade movably and the peeling mechanism movably, wherein lower end portions of the pair of peeling arms are at positions at which the lower end portions adjoin each other, and the pair of peeling arms extend in a direction to become farther from each other at more upward portions thereof than at the lower end portions, and peel the recording paper from the movable blade at upper end portions thereof.

10. A printer including: a cutter unit configured to cut recording paper; and an actuating unit configured to actuate the cutter unit, the printer being configured to perform printing while conveying the recording paper, the cutter unit, comprising:

a movable blade that can advance toward or retract from the recording paper and is configured to cut the recording paper when the movable blade advances; and a peeling mechanism including a contacting portion configured to move in a direction opposite to a direction of advancement or retraction of the movable blade and contact the recording paper, wherein the peeling mechanism is displaced between a peeling position, which is a position of contact with the recording paper, and a retreated position, which is reached by retreating in a direction to become farther from the recording paper than when the peeling mechanism is at the peeling position.

* * * * *